United States Patent
Zimmermann

[11] Patent Number: 6,094,582
[45] Date of Patent: Jul. 25, 2000

[54] METHOD, COMMUNICATION SYSTEM AND APPARATUS FOR SWITCHING CALLS ON A COMMON CHANNEL TO ANOTHER CHANNEL

[75] Inventor: Gerd Zimmermann, Eckental, Germany

[73] Assignee: Telefonaktiebolaget LM Ericsson, Stockholm, Sweden

[21] Appl. No.: 09/141,593

[22] Filed: Aug. 28, 1998

[30] Foreign Application Priority Data

Aug. 29, 1997 [DE] Germany .......................... 197 37 830

[51] Int. Cl.⁷ ....................................... H04Q 7/00
[52] U.S. Cl. ........................................ 455/452; 455/509
[58] Field of Search ..................... 455/422, 426, 455/436, 439, 450, 452, 447, 501, 432, 509, 67.3, 63

[56] References Cited

U.S. PATENT DOCUMENTS 4,965,850  10/1990  Schlomer .

FOREIGN PATENT DOCUMENTS

| 4307966A1 | 9/1994 | Germany . |
| 0719064A2 | 6/1996 | WIPO . |
| WO96/25015 | 8/1996 | WIPO . |
| WO93/26100 | 12/1996 | WIPO . |

OTHER PUBLICATIONS

D. Mosimann, P. R. Cabestre: Mobilitat in privaten Telekommunikations–netzen (PTN) in: TEC Mar. 1995 (Das technische Magazin von ASCOM), Seiten 14–20 (w/English Excerpt).

Primary Examiner—Reinhard J. Eisenzopf
Assistant Examiner—Marsha D. Banks-Harold
Attorney, Agent, or Firm—Burns, Doane, Swecker & Mathis, L.L.P.

[57] ABSTRACT

The invention relates to a method, a communication system and a switching apparatus which perform a switching of calls to another channel (CC2) when two or more calls simultaneously attempt to use a channel (CC1). According to the invention, each channel is first set (S3, S4, S5, S8) to a first call state when first attempting to use a channel. In the first call state, first predetermined transmission conditions must be satisfied (S5) in order that the call proceeds to a second call state (S9, S10, S11, S14) in which second predetermined transmission conditions (S11) must be satisfied. Due to this progression of the call through a first, second and possibly higher order call states, it can ensured that always a new call will always accomplish a hand-over to a new channel (CC2). The invention finds particular application when a channel may be used several times by several calls in a communication network of a channel re-use type and a substantial interference of the at least two calls occur when they use the same channel in close proximity, e.g. when handing over a mobile telephone of a GSM system to a GSM-based cordless telephone system.

58 Claims, 6 Drawing Sheets

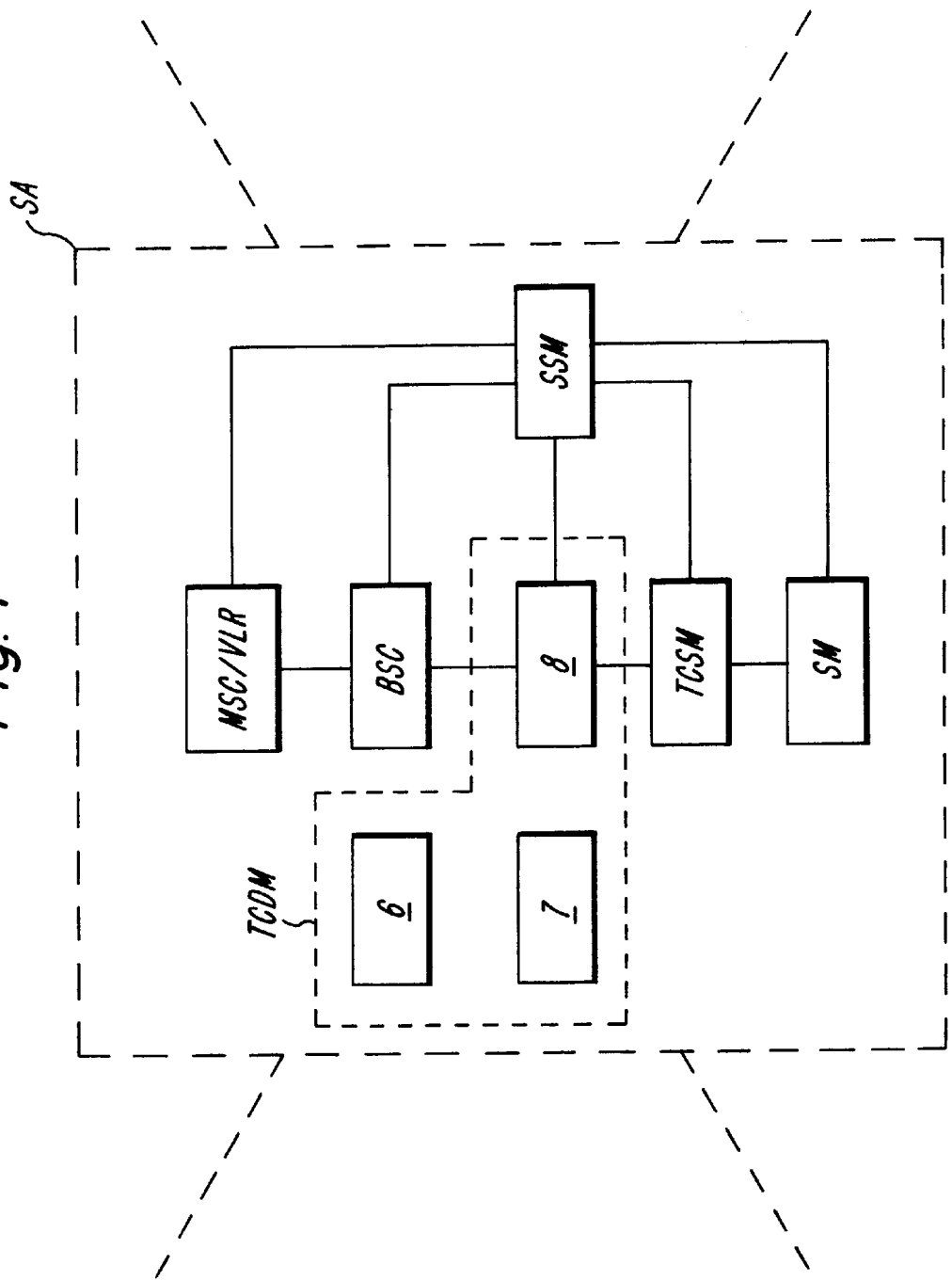

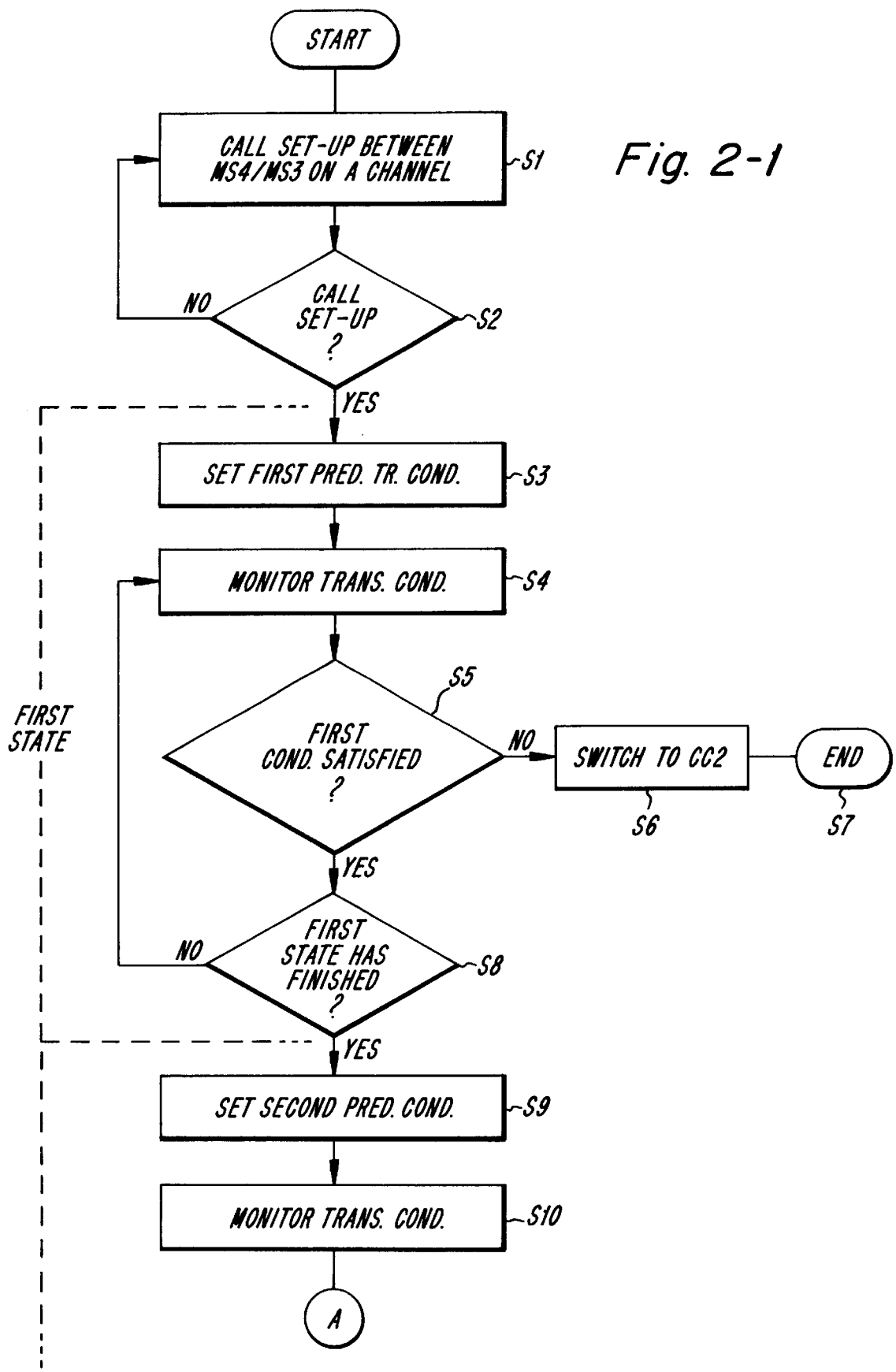

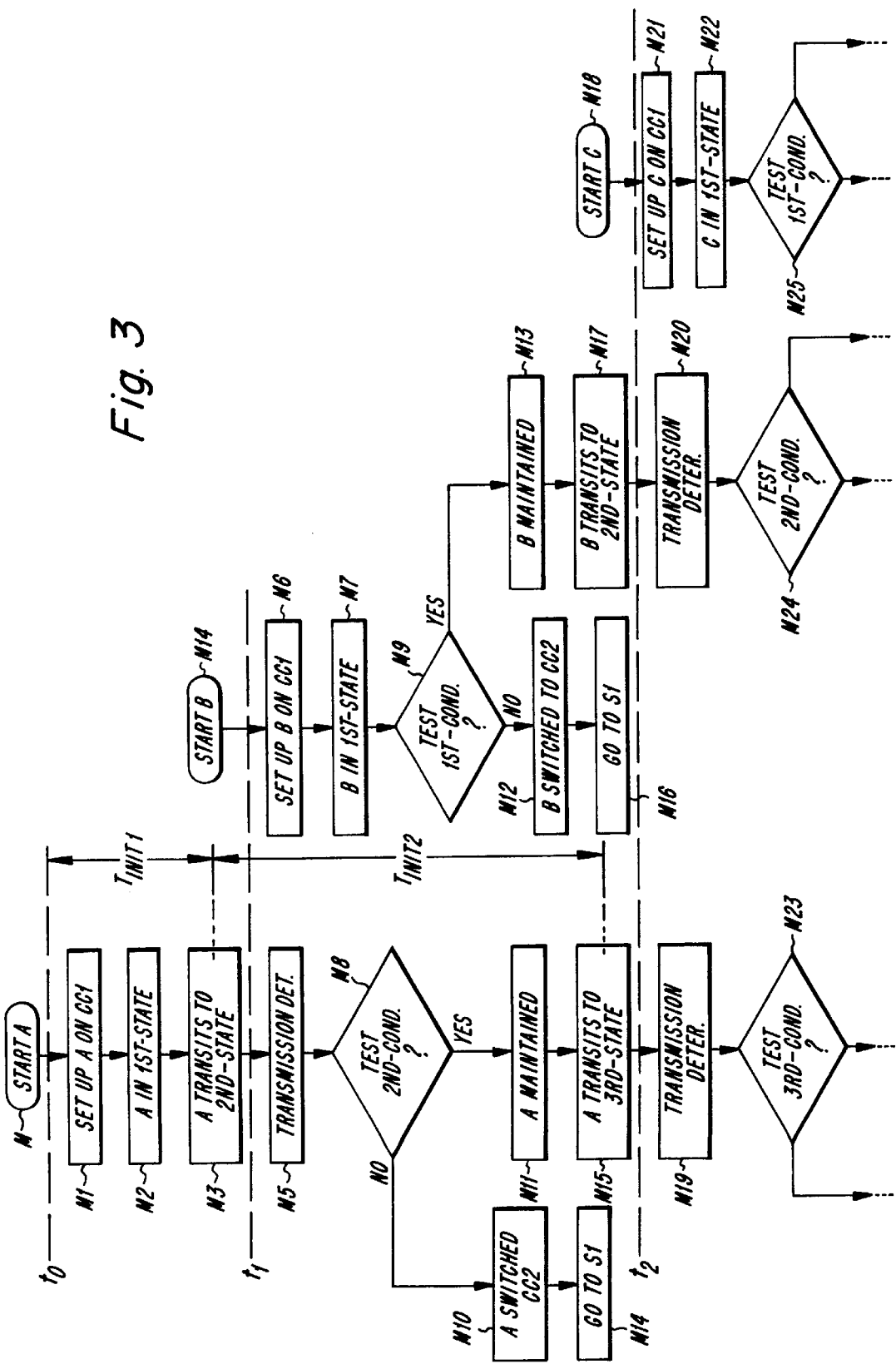

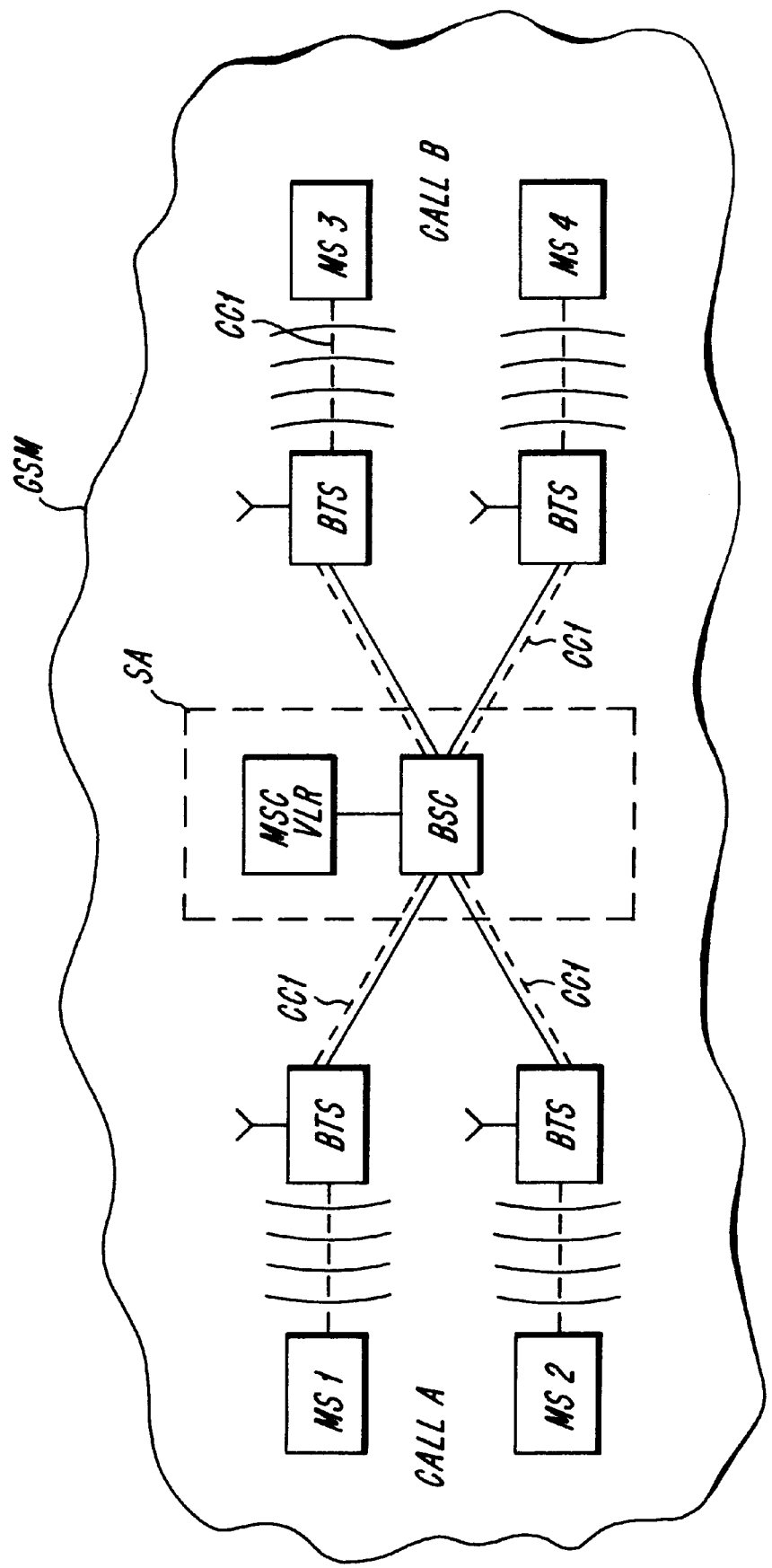

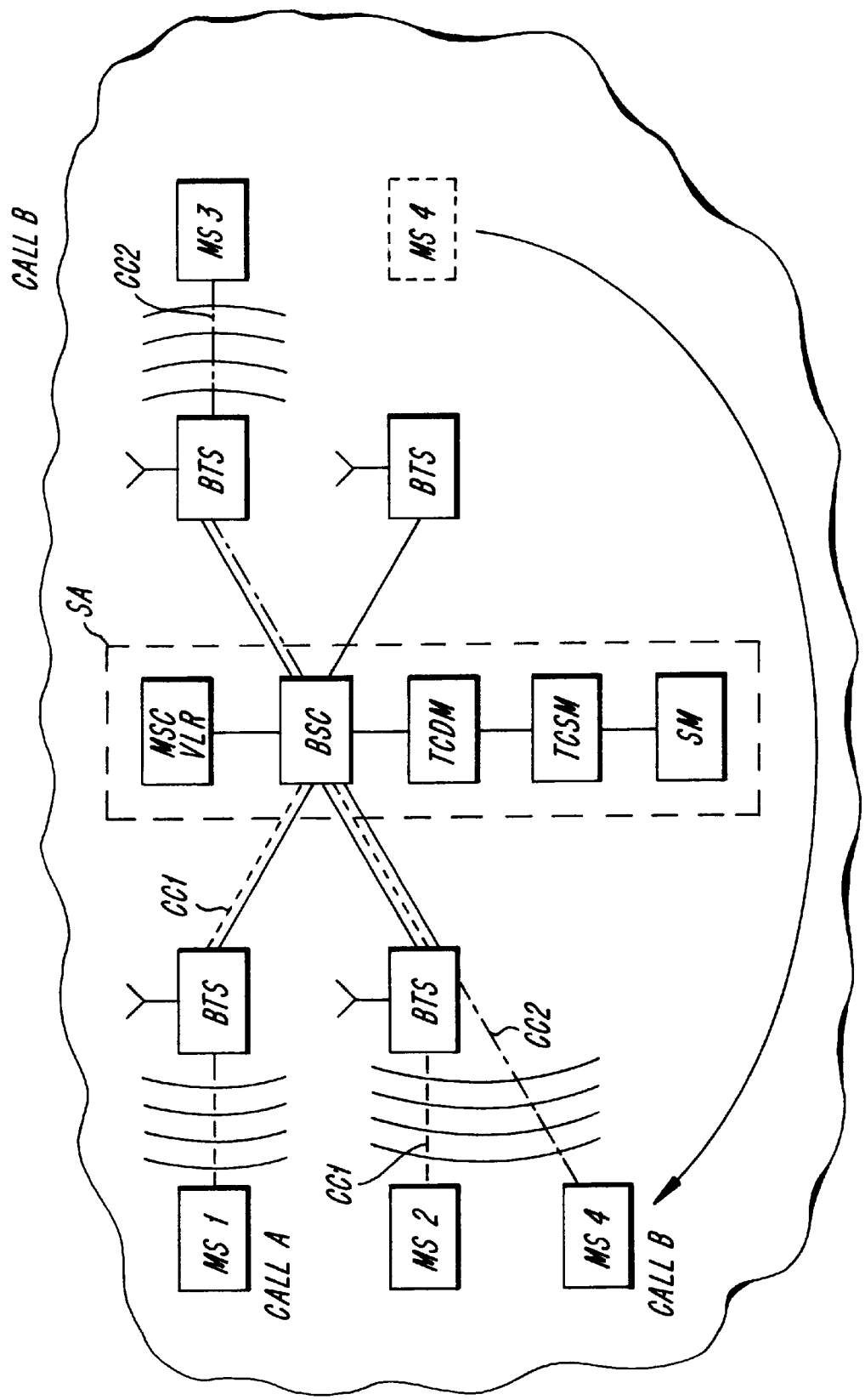

METHOD, COMMUNICATION SYSTEM AND APPARATUS FOR SWITCHING CALLS ON A COMMON CHANNEL TO ANOTHER CHANNEL

This application claims priority under 35 U.S.C. §§119 and/or 365 to 197 37 830,7 filed in Federal Republic of Germany on Aug. 29, 1997; the entire content of which is hereby incorporated by reference.

FIELD OF THE INVENTION

The invention relates to a method, a communication system and an apparatus for switching calls set up between at least two subscriber stations on a respective channel to another channel in a communication network of a channel re-use type. In such a communication network at least two subscriber stations can simultaneously use the same channel when substantially no interference between them exists and calls are switched to another channel only when substantial interference between them exist. Thus, in communication networks of the channel re-use type, the resources, i.e. the number of available channels, are used very efficiently.

As will be explained below, conventionally only very simple hand-over procedures are available to switch a call to another channel, i.e. to hand-over a call on a channel to another channel, if an interference between two calls on the same channel occurs. That is, in principle the conventional hand-over procedure resides in switching both calls on a common channel to an different channel when a strong interference or deterioration of the transmission conditions occurs. Then invention relates to a more intelligent hand-over procedure.

BACKGROUND OF THE INVENTION

As an example, FIG. 4 shows a mobile radio communication system GSM consisting of a mobile switching center MSC/VLR, a base station controller BSC, base transmitter stations BTS and a number of mobile stations MS1, MS2, MS3, MS4. The mobile switching center MSC/VLR and the base station controller BSC are considered to form a switching apparatus SA for switching calls between the individual mobile stations. FIG. 4 is only an example of a cellular mobile radio communication system, where each mobile station MS1 . . . MS4 is served by a separate base transmitter station BTS and the mobile stations MS1 . . . MS4 are each located in different cells of the network. Of course, mobile stations may move from cell to cell and may be served by different base station transmitters BTS and different base station controllers BSC. For illustrating the background of the invention, the mobile stations MS1 . . . MS4 are assumed to be located in different cells.

As indicated in FIG. 4, in mobile radio communication systems (e.g. GSM, DECT), separate channels CC1 are used for a communication, i.e. a call, between two or more subscriber stations. These channels can differ e.g. in the carrier frequency (in FDMA systems) or in time slots within a certain carrier frequency (in TDMA systems) or they can differ in both the carrier frequency and the time slot (in FDMA/TDMA systems, e.g. GSM). Normally, a certain channel can only be used by one single call, i.e. one single communication link. However, as is indicated in FIG. 4, in order to increase the capacity of the radio communication system, channels are re-used several times in a communication network of a channel re-use type, if the subscriber stations are far enough away from each other so that they cannot significantly interfere with each other. For example, in FIG. 4, the call A between the subscriber stations MS1, MS2 and the call B between the subscriber stations MS3, MS4 both use the same communication channel CC1 and since they are served by different base transmitter stations BTS in different cells assumed to be located far away from each other, obviously no problem with interference occurs here.

As is indicated in FIG. 5, if the subscriber station MS4 moves into a cell where the communication channel CC1 is used by call A between the subscriber stations MS1, MS2, then a substantial interference between call A and call B occurs and therefore, the call B is handed over to another free channel CC2. In FIG. 5 such a switching would e.g. be made by the central switching apparatus SA which can monitor the transmission conditions for each call A, B and perform a switching if the transmission conditions deteriorate due to the two calls A, B using the same channel CC1 in close proximity. Which new channel CC2 is to ba selected in turn depends on the present transmission conditions on the new channel and this channel selection procedure is accomplished by an adaptive frequency allocation (AFA) and a dynamic channel selection (DCS).

FIG. 4 and FIG. 5 only show the hand-over procedure for a general mobile radio communication system, such as a GSM system or a DECT system. Nowadays, the fixed network operators provide their subscribers with cordless telephone sets which allow a free movement of the subscriber at home. Conventionally, such cordless telephone systems which have a limited transmission/reception range, use again separate channels with no relationship to the frequencies used for transmission by the fixed network and certainly without a relationship of channels used in a GSM system. If a subscriber uses a mobile telephone and a cordless telephone, no interference problems will be caused since the two individual systems use different channels. Since for example a DECT (Digital Enhanced Cordless Telephone) and GSM-system use different frequencies, it is unlikely, that such an interference will occur.

Advanced telecommunication systems aim at providing the subscribers with more functionalities, i.e. to use a mobile telephone registered for the GSM network also as a cordless telephone at home. That is, it would be desirable to provide the capability (and the practicability) of a cordless system which is entirely based on the GSM-technology and thus presents an alternative to a DECT system. That is, the same handy should be used in the GSM-network and then be transferred to a local base station at home using the same GSM-technology for a communication. Thus, whilst conventional handys incorporated a switching between the GSM-system and the DECT system, such a fully GSM-based system would allow the user to use the handy in the GSM-network as well as at home, only that at home it would be served by another (local) station.

In doing so, the GSM-based Cordless Telephone System CTS has to use the same frequency spectrum, i.e. the same channels, as the overlaying cellular GSM system. Furthermore, since the cordless telephone system CTS is only connected to the fixed network, it cannot be controlled by the cellular system and can therefore not be considered by the frequency or channel planning of the cellular network.

Thus, since the cordless telephone system and the GSM system must use the same channels if the mobile telephone is also to be used as a cordless telephone at home, the hand-over of a call on a channel to another channel cannot be controlled by a central unit, since the two overlaying systems (cordless telephone system and GSM system) are not centrally but separately controlled. Therefore, an autonomous channel selection procedure has to be implemented in the cordless telephone system, so as to select channels from the available frequency spectrum that can be used by the CTS without interfering with the cellular GSM system as well as other CTS users. This channel selection procedure is accomplished by an Adaptive Frequency Allocation (AFA) and a Dynamic Channel Selection (DCS). The AFA routine provides each CTS base station with an ordered set of carrier frequency candidates which minimize the interference with the cellular system, whereas the DCS routine provides the CTS base station with a certain suitable channel which minimizes the interference with other CTS subscribers and the cellular subscribers. However, since the two individual systems are separate from each other, the hand-over must be controlled separately and autonomously by each base station or mobile station being part of each communication link.

STATE OF THE ART

FIG. 5 shows a transmission condition determination means TCDM, a transmission condition setting means TCSM and a switching means SM being part of the central switching apparatus SA of the communication network. These means are used for effecting the hand-over of the call A from a communication channel CC1 (FIG. 4) to another communication channel CC2. As an example, FIG. 5 shows these means to be part of the central unit since the switching is illustrated with reference to a single mobile communication system. If the communication system is based on a combination of a GSM and a CTS system, then such means may be provided in the individual base stations for performing the autonomous hand-over independently of a central unit.

The transmission condition determining means TCDM determines transmission conditions of the calls A, B on their respectively selected channel CC1. This gives a certain quality criterium for each communication (each call). Such transmission conditions may be the measured field strength, the mean bit error ratio or a distance between a base station and a mobile station or even a combination of different transmission conditions. If such transmission conditions fall below a predetermined transmission condition (transmission threshold quality), set by the transmission condition setting means TCSM, then the dynamic channel selection algorithm DCS provides a new channel CC2, which fulfils the predetermined transmission condition required for a call.

DISADVANTAGES OF THE CONVENTIONAL CALL HAND-OVER

Whilst the determination of transmission conditions and the selection of a new channel can still be carried out comparatively reliably in one single communication network by a central unit, in autonomous radio communication systems, like a cordless telephone system CTS or a GSM-based cordless telephone system CTS, the transmission condition determination and the channel selection cannot be controlled by a central unit, since each communication link (call) must control its switching itself. Therefore, there may arise a situation when the decision for the selection of a communication channel before the beginning of a communication can only be based on comparatively unreliable transmission conditions (quality criteria of the transmission quality on a channel) or on unreliable measurements or even on no transmission condition at all. If such inappropriate determination of transmission conditions on a desired channel is autonomously made by the call (i.e. by the base station or the mobile station), it can occur that a channel is selected by a subscriber station, which is already occupied by another subscriber station. Then, both calls will hold on to the same communication channel even though they are not far away from each other and thus they disturb each otter. This will cause a further need for a hand-over of both calls.

Of course, conventionally provisions are made that not two calls simultaneously use the same channel when there is a strong interference between them. That is, normally both calls recognize that they are disturbed since the transmission conditions (e.g. the bit error rate) drastically deteriorates. In this situation, both calls after having recognized that they are disturbed, will perform a hand-over or switching to a new channel separately, i.e. both calls leave the disturbed channel.

When both calls have decided that a hand-over needs to be performed, it can further occur that both calls will select the next best channel due to their own dynamic channel allocation procedure and this again leads to a disturbed communication on a new channel. Then, again both calls will perform another hand-over. Therefore, in particular in such autonomous systems, a high number of hangovers to new communication channels may be performed which leads to a overall deterioration of the transmission quality and can lead to a very unstable system. Thus, the number of such unnecessary hand-overs should be kept as low as possible.

Whilst the above-described problems are particularly severe in such autonomous systems as a GSM-based cordless telephone system, the same problem likewise occurs in the mobile radio communication system itself (see FIG. 5). When the mobile station MS4 moves into close proximity to mobile stations MS1, MS2, then not only the call A may be switched to another channel due to a determination of a deterioration of transmission conditions, but also the call B, since B may likewise detect a deterioration of transmission conditions. Both calls may also here select the same new channel such that the above-described problems are the same.

SUMMARY OF THE INVENTION

As explained above, since in the conventional system a hand-over of a call from one channel to another channel is only based on the determination of the transmission conditions on the channels, both calls attempting to use the same channel will perform a hand-over to a new channel and they may even do so repeatedly if both calls select the same new channel which leads to drastic deterioration of the communication quality of each on-going call.

Therefore, the object of the present invention is to provide a method, a communication system and a switching apparatus which ensure a high transmission quality for at least two calls which simultaneously attempt to use a same communication channel for transmission.

SOLUTION OF THE OBJECT

This object is solved by a method for switching calls set-up between at least two subscriber stations on a respective channel to another channel in a communication network of a channel re-use type where at least two calls can simultaneously use the same channel, the transmission conditions of said calls are determined and calls are switched to another channel when their transmission conditions do not satisfy predetermined transmission conditions, wherein each call after being set-up on a channel is set in a first call state, in which said call is switched to another channel when its transmission condition does not satisfy a first predetermined transmission condition, and is set to at least a second call state, when said call is not switched in said first call state, wherein in said second call state said call is switched to another channel when its transmission condition does not satisfy a second predetermined transmission condition different from said first predetermined transmission condition.

Furthermore, this object is solved by a communication system of a channel re-use type where at least two calls between at least two subscriber stations can simultaneously use the same channel when substantially no interference between them exists and where calls are switched to another channel when a substantial interference between them exist, comprising:

a) a transmission condition determining means for determining transmission conditions of said calls on said channel;

b) a transmission condition setting means for setting predetermined transmission conditions for said calls; and c) a switching means for switching said calls to another channel when said determined transmission conditions do not satisfy predetermined transmission conditions;

d) a call state setting means for setting a call after being set-up on a channel into a first call state and for setting said call into at least a second call state, when said call is not switched to another channel in said first call state;

e) said transmission condition setting means setting respectively different predetermined transmission conditions for said first and said at least one second call state; and f) said switching means switching said call to another channel in said first or second call state when said determined transmission conditions of said call in said first or second call state do not satisfy said first or second predetermined transmission conditions, respectively.

Furthermore, this object is also solved by a switching apparatus in a communication system of a channel-reuse type where at least two calls between at least two subscriber stations can simultaneously use the same channel when substantially no interference between them exists and said calls are switched to another channel when a substantial interference between them exists, comprising:

a) a transmission condition determining means for determining transmission conditions of said calls on said channel;

b) a transmission condition setting means for setting predetermined transmission conditions for said calls; and c) a switching means for switching said calls when said determined transmission conditions do not satisfy predetermined transmission conditions;

d) a call state setting means for setting a call after being set-up on a channel into a first call state and for setting said call into at least a second call state, when said call is not switched in said first call state;

e) said transmission condition setting means setting respectively different predetermined transmission conditions for said first and said at least one second call state; and f) said switching means switching said call to another channel in said first or second call state when said determined transmission conditions of said call in said first or second call state do not satisfy said first or second predetermined transmission conditions, respectively.

According to the invention, each call is set in a first call state when it first attempts to use a communication channel which may or may not be occupied by another call already. If first predetermined transmission conditions are satisfied with said call being in said first call state, then the call is transferred to a second call state where different predetermined transmission conditions need to be satisfied. Advantageously, the call set in said second state can be transferred to a third, fourth, . . . n-th call state if the second transmission conditions and further transmission conditions in said other call states are successively satisfied.

Therefore, if a new call starts to use the same channel which is already occupied by another call being set in the second call state, this new call will perform a switching to a new channel very fast and certainly much faster than the call in the second call state. Thus, disturbance of the call in the second call state by the call in said first call state is reduced and it is avoided that both calls will simultaneously perform a switching to a new channel which reduces the number of switchings for the new call before it finds a channel on which said first predetermined transmission conditions can be satisfied. Thus, the number of collision, between the calls can be reduced.

Preferably, the call is held in said first call state for a predetermined time period before being set into said second call state. However, other criteria can be used for transferring the call from the first call state into the second call state. For example, in the first call state, a predetermined number of tests of the transmission conditions available on the channel against the predetermined first transmission conditions can be performed and when each of these tests indicate that the first predetermined transmission conditions are satisfied, then the call is transferred into said second call state.

In a communication network of a channel re-use type, indeed there may be more than two calls simultaneously using the same channel as long as they do not substantially interfere with each other, that is, if the distance between them is large. If several subscriber stations move into close proximity to each other, then it may indeed occur that more than two calls simultaneously attempt to use the same channel. In this case, preferably each cell is successively transferred from the first to a second, third . . . n-th call state in which respectively different predetermined transmission conditions have to be satisfied. Thus, it can always be ensured that the latest call attempting to use the same channel will be rejected and switched to a new channel if the presently available transmission conditions on the channel are sufficient to support e.g. two separate calls but not more than two separate calls.

The transmission conditions can advantageously comprise a field strength on said channel and/or a mean bit error rate on said channel and/or a measured distance between a transmitter station of the communication network and the subscriber stations.

Preferably, the n-th predetermined transmission condition specifies—as a switching criterion as to whether the call is allowed to remain on the channel—a lower transmission quality of the call than a transmission quality specified by a (n−1)-th predetermined transmission condition. That is, a call in the (n−1)-th call state will be switched to a new channel if it cannot satisfy the requirement for a very high transmission quality (e.g. a very low mean bit error rate) on this channel. If the call in the (n−1)-th call state satisfies such a high transmission quality, then it is allowed to proceed to the next n-th call state. In the n-th call state the call will only be switched if its transmission condition falls below a lower transmission quality. Therefore, the probability that the call is switched in the n-th call state is far smaller than for a call in the (n–1)-th call state. However, the overall quality of a call in a higher call state actually improves since it is less frequently switched. Hence, a call when being transferred from said first to said second call state and from said second call state to said other call states becomes more and more stable, i.e. more robust or more insensitive with respect to a deterioration of transmission quality due to an external disturbance or an interference by one or more new calls in lower call states attempting to use the same channel simultaneously.

The predetermined transmission conditions in each call state can be fixed beforehand or can preferably be dependent on the number of calls attempting to use the same communication channel. Likewise, the predetermined transmission conditions can be altered with respect to the number of attempts of other calls trying to use the same communication channel within a given time period. Thus, it can e.g. be ensured that a call which has already proceeded to a call state of a high number is released or switched to another channel, since its transmission conditions have at least been temporarily, however, repeatedly been disturbed by repetitive other call attempts (since an attempt of each call, even when it is in the first state, will temporarily deteriorate the available transmission quality on the channel). Thus, preferential selection of a call amongst several calls attempting to use the same channel can be made.

According to another embodiment of the invention the predetermined transmission conditions in each call state can also be different for each subscriber station. Also the holding time or a call priority indication which indicates that certain call states should be skipped during the call progress can be different for each subscriber station. Advantageously, they can be dependent on a priority assigned to each subscriber station. Hence, a call from a subscriber station having a high priority can proceed to a higher call state faster or more easily than a subscriber station of a lower priority. Advantageously, also the predetermined time for which the call is held in each call state can be dependent on such a call priority indication. It is also possible to allow certain calls to completely skip some intermediate call states dependent on such a priority. This enables certain calls of high priority to proceed to high order call states (where they are very stable against a disturbance) very rapidly. Such dependencies on the priorities for the call progress through the call states can also be mixed, i.e. the priority can be simultaneously used to set different transmission conditions and holding times for the calls in each state and to specify which call states should be completely skipped.

Further advantageous embodiments and improvements of the invention are listed in the dependent claims. Hereinafter, the invention will be described with reference to its preferred embodiments with reference to the attached drawings.

BRIEF DESCRIPTION OF THE DRAWINGS

Throughout the description, the same or similar reference numerals are used to designate the same or similar parts or steps in the drawings.

FIG. 1 shows a block diagram of a part of a communication system incorporating a switching apparatus with a call state setting means SSM;

FIG. 2-1 and FIG. 2-2 show a flow chart describing an embodiment of the inventive method using two call states;

FIG. 3 shows an embodiment of the inventive method when three calls A, B, C simultaneously attempt to use the same channel and at least three call states are used;

FIG. 4 shows an overview of a mobile communication network of a channel re-use type where two calls A, B use the same communication channel CC1; and FIG. 5 shows an overview of the communication system of FIG. 4 when a mobile station MS4 has switched its communication channel CC1 to a new communication channel CC2.

PRINCIPLE OF THE INVENTION

Figure 2:
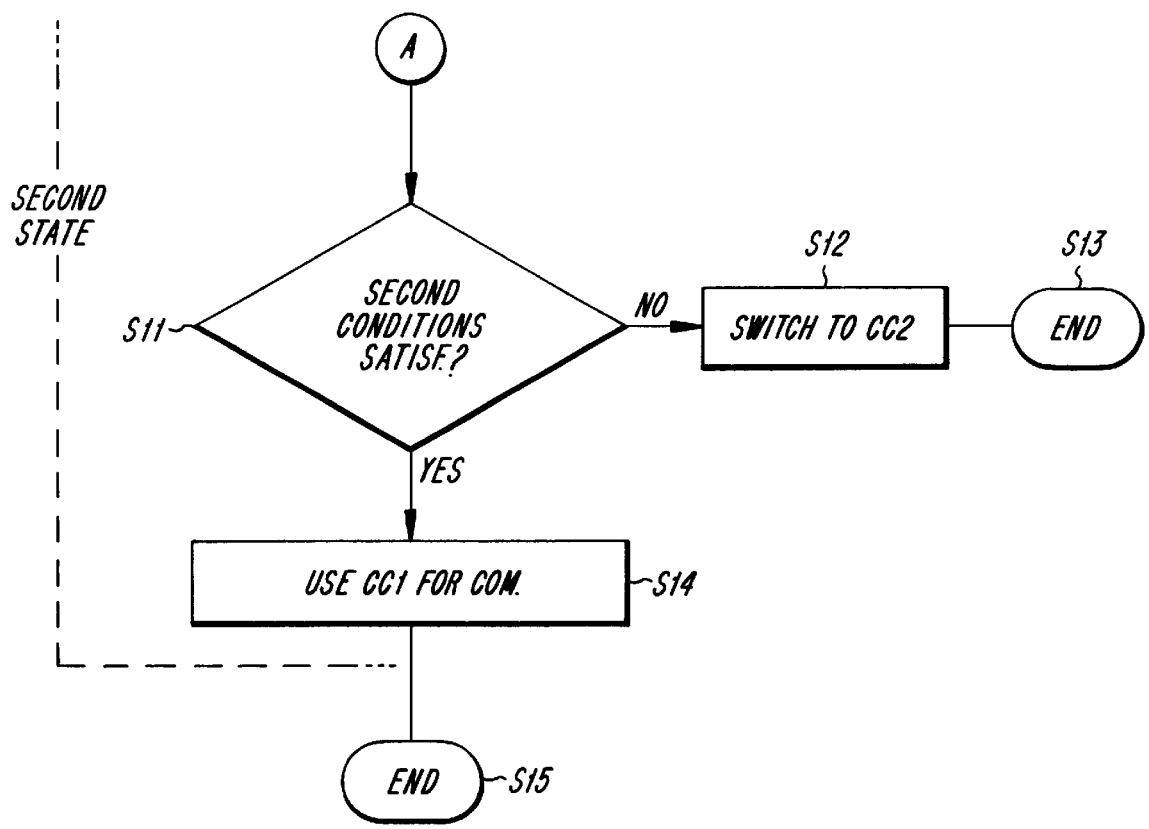

FIG. 1 shows a part of the communication network GSM in FIGS. 4, 5 including a switching apparatus SA according to the invention. The switching apparatus SA contains the means TCDM, TCSM and SM already shown in FIG. 5 and additionally a call state setting means SSM. Together with the call state setting means SSM, the means TCDM, TCSM and SM perform a different hand-over algorithm than that explained with reference to FIG. 5.

It should again be noted that FIG. 1 only shows as an example that the central unit SA of a mobile communication network contains the inventive means TCDM, TDSM, SM and SSM. For autonomous systems, as explained above, the means TCDM, TCSM, SM and SSM may be provided in a unit that is responsible for separately and autonomously controlling the hand-over, e.g. a transmitter station or base station or even a mobile station being part of the communication link to be transferred between the GSM system and the cordless telephone system CTS.

The call state setting means SSM sets a call after being set up on a channel CC1 into a first call state and sets this call into at least a second call state, when the call is not switched to another channel CC2 in said first call state, i.e. when a request for a hand-over of tile call (i.e. a switching of the call) is not made in the first call state because the call could satisfy the first predetermined transmission conditions. The transmission condition setting means TCSM sets respectively different predetermined transmission conditions for said first and said at least second call state and the setting means SSM switches the call to another channel in said first or second call state when said predetermined transmission conditions of said call in said first or second call state do not satisfy said first or second predetermined transmission conditions, respectively.

It should also be understood that the term "call" as used herein comprises the already ongoing call between two or more users or a call set-up request made by a subscriber station before the call is actually fully set-up. That is, the transmission quality with respect to the predetermined transmission conditions can be determined when the call is already set-up and the communication between the subscriber stations takes place on the channel, or during call set-up when the calling subscriber station first attempts to seize the channel to set-up the call to the called subscriber station.

FIRST EMBODIMENT USING TWO CALL STATES

FIGS. 2-1, 2-2 show an embodiment of the method of the invention when only two call states are used with respectively different predetermined transmission conditions.

In step S1, a call set-up between two subscriber stations, e.g. between the mobile stations MS4 and MS3 in FIGS. 4, 5 is performed on a channel. This channel may or may not be already occupied by another call. In step S2, it is verified whether the call has been set up. If it was not possible to set up the call, then a further call set-up is made on a different channel again in step S1. In steps S1, S2, a dynamic channel selection is performed according to the channel quality present on a channel selected to be used for a communication.

Once the dynamic channel selection algorithm has been successful in selecting a channel, the call set-up on this channel is set in a first call state in step S3. In the first call state, first predetermined transmission conditions must be fulfilled in order that the established call is not switched to another channel. Therefore, in step S4, the presently available transmission conditions on the selected channel are monitored. If in step 5, the first transmission conditions cannot be satisfied, the call is switched to another communication channel in step S6. If the first predetermined transmission conditions are satisfied, it is tested in step S8 whether the first call state has finished or not.

According to one embodiment of the method according to the invention, the call is held in said first call state for a predetermined time period $T_{init1}$ before it is transferred into said second call state. In step S3, a counter set to the predetermined time period $T_{init1}$ can be set and the elapsed time is monitored in step S8.

According to another embodiment of the invention, it is checked in step S8 how often the first predetermined transmission conditions have been tested in step S5. If a counter incremented in step S5, each times the conditions are satisfied, exceeds a predetermined number in step S8, the call is transferred to the second call state. Other criteria but the elapse of the time $T_{init1}$ or the number of testings in step S5 can be employed for transferring the call from the first call state to the second call state.

One individual test or comparison of the presently prevailing transmission conditions on the channel against the first predetermined transmission conditions in step S5 can comprise the measurement of a field strength on said channel and/or a detection of a mean bit error rate on said channel and/or a measuring of a distance between a transmitter station and subscriber station and the comparison of such values with predetermined default values. To carry out the test in step S5, the transmission condition determining means TCDM may comprise a field strength measurement means 6 and/or a detection means 7 and/or a distance measuring means 8 as schematically shown in FIG. 1.

One test (comparison) in step S5 using the bit error rate as a measure for the presently available transmission conditions can be performed as follows. The error detection means 7 measures the bit error rate BER on said channel a predetermined number of times $N3_{init}$ over a predetermined time period $T_{speech}$ in said first call state (and analogously in step S11 in said second call state described below). The channel quality measurement can be the averaged bit error ratio BER before channel decoding assessed over time period $T_{speech}$ of one full rate speech block, e.g. 20 ms. The error detection means 7 then determines how many times $P_{init}$ said measured bit error rate values BER exceed a predetermined maximum bit error rate $BER_{max}$ in said predetermined time period. The predetermined transmission conditions set by said transmission condition setting means TCSM in said first state specify a maximum number of times $P3_{init}$ that said measured bit error rate values BER are allowed to exceed said maximum bit error rate $BER_{max}$. When the number $P_{init}$ exceeds the value $P3_{init}$, the switching means SW switches the call to another channel CC2 in step S6, since it is then assumed that this channel is already occupied by another call. Therefore, if at least $P3_{init}$ out of $N3_{init}$ values are above the threshold $BER_{max}$, the hand-over is initiated. This hand-over must be very fast in order to not disturb other calls and to quickly find another channel CC2 with sufficient transmission conditions. For this required fast reaction, the value $P3_{init}$ should be a small integer value. For example, in the first state, the switching means SW will perform a switching when 2 out of 10 BER measurements are above a certain threshold $BER_{max}$.

If the test in step S5 is positive, i.e. the number of times $P_{init}$ that said measured bit error rate values exceed said maximum bit error rate is not larger than said maximum number of times $P3_{init}$ then the call is presently held on the selected channel CC1. If it is determined in step S8 that the first call state has finished, e.g. that a predetermined time set in a counter after the call was first set up on the channel has been expired (e.g. the initial time period $T_{init1}$ at the beginning of a call or after a switching-over to a new channel may be $T_{init1}$=2 s) or if a predetermined number of tests has been executed in step 5, then the call state setting means SSM will transfer or set tone call on the channel into the second state. In the second state, in step S9, the transmission condition setting means TCSM will set new second predetermined transmission conditions and in step S10, again the transmission conditions on the channel are monitored. In step S11, the present transmission conditions of the call on the channel are again tested, however, now against the new second predetermined transmission conditions. Thus, the switching conditions for switching to a new channel with said call in said second call state differ from the switching conditions when said call is held in said first call state.

If in step S1, the bit error detection means 8 is employed for testing the transmission conditions, then the transmission condition setting means TCSM now sets a new maximum number of times P3 that said measured bit error rate values are allowed to exceed the maximum bit error rate $BER_{max}$. For example, if in the first call state the switching is requested when 2 out of 10 BER measurements are above a certain threshold $BER_{max}$, then in the second call state, a switching is only requested if 40 out of 50 BER measurements are above the same threshold $BER_{max}$. Again the same predetermined time period $T_{speech}$ may be used in said step S11.

Therefore, if during the first call states no switching is necessary, that is, no hand-over request needs to be issued, it is assumed that the channel was either not occupied by another call (user) at all or that the channel was occupied by another user, however, the interference with said other user (call) was so insignificant (the subscribers are so far away from each other) that no switching was necessary.

During the second call state, the call is then only switched if at least P3 out of N3 values are above the threshold bit error rate $BER_{max}$. Here, $P3 \geq P3_{init}$ and $N3 \geq N3_{init}$ can be satisfied. Such a restriction takes into account that e.g. the attempt of another CTS call to use the same channel should not lead to a switching of the call in the second state, but to a switching of the new call still being in the first call state. Suitable values are e.co. N3=6, $N3_{init}$=3, P3=10, $P3_{init}$=5, $T_{init}$=2 s and $T_{speech}$=20 ms.

If the second predetermined transmission conditions are satisfied in step S11, then it is determined that the call in said second state is presently not disturbed and can be used in step S14. If the conditions are not satisfied in S11, the call is switched to another channel CC2 in step S12 even when it has already proceeded to the second call state.

It should be noted that whenever the call is switched to a new channel in step S6 or in step S12, that call will again assume the first call state on this new other channel CC2, independent of the fact whether the new channel is occupied by another call or not, since in particular in autonomous systems, the call has no information as to whether a call is present on the other channel or whether transmission conditions will be appropriate before actually having been set up on the new channel CC2.

From the above, it will be appreciated that a call being tested against the second predetermined transmission conditions in the second call state is less sensitive to disturbances on the channel than a call being tested against the first predetermined transmission conditions in the first call state. That is, in the first call state, the call is already switched to another channel if only minor disturbances occur whilst the call in the second call state is only switched to another channel if a drastic deterioration or disturbance of the transmission conditions occurs.

A call in the second call state will be switched to a new channel if it cannot satisfy the requirement for a very high transmission quality (e.g. a very low mean bit error rate) on this channel. If the call in the first call state satisfies such a high transmission quality, then it is allowed to proceed to the next second call state. In the second call state the call will only be switched if its transmission condition falls below a lower transmission quality. Therefore, the probability that the call is switched in the second call state is far smaller than for a call in the first call state.

Thus, the predetermined transmission conditions to be satisfied in every call state indicate—as a switching criterion—the minimum transmission quality which a call is allowed to have (due to a temporary disturbance) before it is being switched to a new channel. The fact that for this purpose the predetermined transmission conditions of a higher call state indicate as such a "lower" transmission quality does not mean that the call itself in such a higher call state has a "lower" transmission quality. It only means that the switching criterion for switching the call is less sensitive and thus the overall quality of the call actually improves since it is less frequently switched.

Hence, a call when being transferred from said first to said second call state becomes more stable, i.e. more robust or more insensitive with respect to a deterioration of transmission quality due to an external disturbance or an interference by one or more new calls in the first call states attempting to use the same channel simultaneously.

Thus, when a "new" call for communication starts to use the same channel which is already occupied by another call or communication, whereas this another call is already being held in the stable second call state, the "new" call will be switched over very fast and certainly much faster than the communication in the second call state. Therefore, only one switching for the new call is necessary and the call in the second (stable) call state remains on the channel stably. The duration of a disturbance by a new call is kept very small (both for the new call still in the first state and also for the call in the second call state). The number of hand-overs in the system is reduced and the number of collisions between calls (communication links) is reduced.

Of course, it cannot be excluded that even when a first call is in the first call state and a second call is in the second call state on the same channel, both calls will not be switched to a channel if a disturbance was so strong that not only the first call but also the second call must leave the communication channel. If both calls are autonomously and accidentally switched to the same new communication channel, then a collision may indeed occur. However, it is expected that such repeated collisions between two calls of e.g. neighbouring cordless telephone system base stations will occur very rarely. A collision can only occur if hand-overs or call set-ups of at least two calls are accomplished indeed to the same new channel and additionally within e.g. $T_{init1}$ seconds. A further measure for further reducing the possibility of such collisions is to select the new channel randomly in a certain quality range within the available channel list. Since e.g. in autonomous systems the base stations operate independently, such a random channel selection will together with the definition of the first and second call state reduce the expected number of collisions to almost zero.

SECOND EMBODIMENT USING MORE THAN TWO CALL STATES

As explained with reference to FIG. 2-1, FIG. 2-2, if certain transmission quality criteria are satisfied in step S5, S11, then a call is set in a second call state where it is comparatively insensitive with respect to a disturbance. When the call is held in the second call state in step S14, then another call may attempt to use this channel as well and can enter a first call state in step S3 ff. If certain first predetermined transmission conditions are not satisfied in step S5, then the call is rejected on this channel and switched to a new channel where again it assumes the first call state.

However, it may occur that even the second later call passes the first call state and is also set into the second call state, since in fact the available transmission conditions allow the supporting of two calls without a drastic disturbance. A third call which then attempts to use the same channel is again set into the initial (first) call state, is possibly rejected or even also allowed to proceed to the second (stable) call state. This would mean that all calls—although they have successively attempted to use the same channel—assume the same second call state without a distinction being made as to the fact which call was the first one.

If in this situation, a further new call attempts to use the channel, it may deteriorate the available transmission conditions to such an extent that all calls in the second call state cannot satisfy even the second (less sensitive) predetermined transmission conditions in the second call state any longer. The same situation may happen when an external disturbance occurs on the channels when several calls are all in the second call state. In this case, all channels in the second call state are switched to a new channel (possibly the same new channel depending on the channel selection algorithm used for the channel selection) Therefore, all calls in the second call state will experience the same switching and no distinction is made as to which call was the first one on the selected communication channel.

According to a further embodiment of the invention, not only a first (initial) call state and a second (stable) call state is used, but the call setting means SSM successively sets a new call into a first, second, third, fourth . . . n-th different call state whereby said transmission condition setting means respectively sets different predetermined transmission conditions for determining a switching to a new channel in each of said n call states. Therefore, a distinction can be made between the individual calls such that every later arriving call will always be the first one to be switched to a new communication channel. If the length of a call state is determined by a certain time period $T_{init1}, T_{init2}, \ldots T_{initn}$ set at the beginning whenever a call enters a new call state, then these predetermined time periods in each call state may assume the same or in fact different values.

If all holding times are the same in all call states, then the calls will be released or switched from a channel in the order in which they have successively attempted to use this channel.

The holding times can be selected such that the holding time is successively incremented (lengthened) with increasing order of the call state. In this case, calls which have been using the channel for a longer period of time than other calls will be switched at the end whilst calls which have been using the channel only for a short period of time will be simultaneously or successively switched if a disturbance occurs.

If the time periods are successively shortened with higher order call states, this will enable calls to more rapidly develop into very stable calls whilst initially after using the channel only for a short period of time, such calls will be very sensitive and will be switched earlier.

It will also be appreciated that the predetermined transmission conditions in each call state are not necessarily fixed in such a manner that successively with higher order call states the transmission quality requirement makes the calls more insensitive. It is also possible to make these predetermined transmission conditions e.g. dependent on the number of calls which simultaneously try to use the channel in any call state or on the number of successive attempts having been made to use the channel.

For example, even when a call has proceeded to a call state of high order and is thus as such rather insensitive with respect to a change of transmission condition, i.e. disturbances by other calls or other noise interference, a transmission condition for this call may still be deteriorated if more calls use the same channel or if repeatedly a short transmission condition deterioration occurs when a new call attempts to use the channel. Therefore, the predetermined transmission conditions which even a stable call is required to satisfy may be altered such that even the stable call is switched to a new (unoccupied) channel where the likelihood of a transmission condition deterioration is reduced.

It may also be appreciated that a preferential selection of the holding times $T_{init}$ together with the setting of the predetermined transmission conditions can be performed. One basic selection would be that the predetermined transmission conditions to be satisfied in each call state makes the call more robust whenever it transits to a call state of higher order and that the holding time in each call state is the same.

THIRD EMBODIMENT USING A CALL PRIORITY INDICATOR

As explained above, in the second embodiment more than two call states are used and a call is successively set into the call states, whereby in each call state a different predetermined transmission condition is used which makes the call more and more robust against a disturbance as it proceeds to higher order call states.

It can however be desirable to allow specific calls (or subscriber stations) to assume higher order call states more rapidly or more easily to ensure that such calls become stable very rapidly even if they attempt the use a channel which is already used by other calls in other call states.

Therefore, for specific subscriber stations and/or specific types of calls a call priority indication may be used which indicates that a call will immediately enter a specific call state when it attempts to use the channel. For example, such an indication may indicate that the call should not assume the first call state but immediately the n−1)-th or the n-th call state.

Furthermore, this call priority indication may also indicate the progress of the calls through the individual call states. Therefore, not necessarily the call progress through successive call states first, second, third . . . (n−1)-th, n-th call state) as in the second embodiment is performed, but the call is allowed to even skip some call states indicated by the call priority indication.

Thus, in terms of the call progress, some calls that may attempt to use the channel later than other calls may actually "overtake" earlier calls which progress through the sequential series of call states. For example, the call progress may be such that the call first enters the first (or even the second) call state and then progresses through a fifth, seventh, tenth, eleventh and fifteenth call state. Thus, a different entry call state as well as a different call progression through the call states may be defined for certain calls. Using this call priority indication (defining possibly a different entry call state for each call in the call state sequence and/or a different progression of the call through the call states) a priority can be given to some calls by contrast to others.

For example, a call of subscriber A with priority 1 is first entered into the first call state and after having passed this call state, it is immediately transferred to a n-th call state, whilst a call from subscriber B having priority 2 is first entered into said first call state and thereafter passed to a n−1)-th state. The call priority indication can also indicate that a call (possibly after it has already passed several call states) is kept indefinitely in a specific predetermined state. For example, although the n-th call state would still be available for the call by subscriber B this call be may indefinitely held in said (n−1)-th state.

Furthermore, as explained above, in each call state the holding time and the predetermined transmission conditions can be set separately for each call or even dependent on the number of calls already present on the channel or attempting to use the channel. The call priority indication for a different call progress of individual calls may be coupled with such a different setting of holding times and predetermined transmission conditions.

The call priority indication may be sent directly by the call or by the subscriber station during a call set-up. The call setting means then performs a setting of the first state and the order how the individual call should progress through the individual call states, possibly together with a specific setting of predetermined transmission conditions and holding times in each state. Alternatively the call priority indications can be held in a central memory unit of the switching means and are read out in accordance with a recognition of a specific call, call type or specific subscriber station.

EXAMPLE USING AT LEAST THREE CALL STATES

FIG. 3 shows an example of the method the invention when at least three different call states are defined for each call. At time t0, the call A is set up on CC1 and transits from the first call state into the second call state in steps M2, M3.

At time t1, it is assumed that the first call A is in the second call state and that the second call B is being set up on the channel CC1 in step M6 such that it is transferred to the first call state in step M7. Although this is not necessarily synchronously performed in FIG. 3 it is here assumed that the first and second predetermined transmission conditions are almost synchronously tested in steps M8, M9. In a rare occasion, both calls may be switched to another channel or even to the same channel CC2 in steps M10, M12 thus causing each call to select a new channel and to be set in a first call state on the new channel in steps M14, M16 see step S1 in FIG. 2-1).

However, most likely the call A can be maintained on the channel in step M11, since the test conditions in step M8 are more robust then the test conditions used in step M9, such that it can occur that the second call B is switched in step M12, M16, whilst the first call A transits already to the third call state in step M15. It can, however, also occur that also the second call B is maintained in step M13 and transits to its second call state in step M17, since both calls A, B respectively satisfied their predetermined first and second transmission conditions. This case is not unlikely to occur since it will always depend on the predetermined transmission conditions as to whether or not a call is released.

Whilst the call A has gone through initial periods $T_{init1}$, $T_{init2}$ i.e. assumed the third call state with a very robust switching condition, at time t2 it is assumed that yet another third call C attempts to use the same channel in step M21. As was the case before in step M5, when the call A was disturbed by the call B, now in steps M19, M20, there is a respective transmission deterioration due to the set-up of the call C on the communication channel in step M21. The new third call C assumes its first call state in step M22.

In steps M23, M24, M25 with call A, B, C, respectively in the third, second and first call state, a comparison with respect to the third, second and first predetermined transmission conditions (here assumed to be respectively fixed) is performed. If the predetermined transmission conditions are such that they are successively requiring a lower transmission quality to be satisfied, then it will always be ensured that the call release or call switching will be performed in the order C→B→A.

However, as already explained generally above, the call A using the communication channel CC1 has its transmission quality already reduced twice, namely due to the set up of call B in step M6 and due to the set up of call C in step M22. Therefore, it may be preferred to now release the call A since it has been several times interrupted (its transmission quality was deteriorated) such that it is preferable to select a new (fresh) communication channel for this call A. This can be accomplished by using different third predetermined transmission conditions in step M23 such that call A is now released.

FIG. 3 only gives an illustration of the call progress through the several call states whereby it is assumed that each call transits to a new call state at exactly the time when a new call assumes its first call state. However, in reality of course the attempt to use the channel by a new call is made completely randomly. A statistics may be determined how often a channel already occupied by one call A is attempted to be used by a further call B, C and furthermore, it can be detected at which timing within the respective periods $T_{init1}$, $T_{init2}$. . . this deterioration of the transmission quality by a new call attempt takes place. The setting of the holding times within each call state as well as the setting of the predetermined transmission conditions can then be made dependent on this statistics.

INDUSTRIAL APPLICABILITY

As explained above, the method, the communication system and the switching apparatus of the invention define at least two call states for every call which attempts to use a new channel. The demand to the requested transmission quality is successively decreased as the number of call states increases. Thus, calls in call states of lower order are much more sensitive to a switching than calls in call states of higher order. Every call always starts in the first call state and is transferred to a next call state if a switching due to respectively predetermined switching conditions is not required.

Such a method, communication system and switching apparatus is particularly advantageous when two communication systems not controlled by a central control unit select channels autonomously. Therefore, the invention is particularly advantageous when being used in a communication system comprising a GSM network and/or a GSM-based cordless telephone system, since here each system will perform a channel selection according to a dynamic channel allocation procedure independently.

What is claimed is:

1. A method for switching S6, S12) calls (A, B, C) set-up (S1, S2) between at least two subscriber stations (MS1–MS4) on a respective channel (CC1) to another channel (CC2) in a communication network (GSM, CTS) of a channel re-use type where at least two calls (A, B, C) can simultaneously use the same channel (CC1), the transmission conditions of calls are determined (S4, S10) and calls are switched to another channel (CC2) when their transmission conditions do not satisfy predetermined transmission conditions (S5, S11), comprising the steps in which each call after being set-up on a channel (CC1) is set (S3) in a first call state, in which the call is switched to another channel when its transmission condition does not satisfy a first predetermined transmission condition, and is set (S8, S9) to at least a second call state, when the call is not switched (S5) in said first call state, wherein in said second call state the call is switched to another channel when its transmission condition does not satisfy (S11) a second predetermined transmission condition different from said first predetermined transmission condition.

2. A method according to claim 1, wherein the call is held in said first call state for a predetermined time period ($T_{init1}$) before being set into said second call state.

3. A method according to claim 1, wherein the call is successively set (M15) to a third, a fourth . . . and a n-th call state in which respectively third, fourth . . . and n-th different predetermined transmission conditions are used (M23) for determining a switching, when said second, third . . . (n–1)-th predetermined transmission conditions are not satisfied in said respective call states.

4. A method according to claim 3, wherein the call is held in said second, third, fourth . . . and n-th call state respectively for a predetermined time period ($T_{init1}$, $T_{init2}$) before transiting to a next call state.

5. A method according to claim 3, a n-th predetermined transmission condition specifies a lower transmission quality of the call than a transmission quality specified by a (n–1)-th predetermined transmission condition.

6. A method according to claim 3, wherein the transmission conditions are dependent on the number of calls already occupying the channel (CC1) and/or the number of repetitive attempts of other calls to use the same channel.

7. A method according to claim 1, wherein
when the call is switched to another channel (CC2), the call enters said first call state on the another channel (CC2).

8. A method according to claim 1, wherein
the transmission conditions comprise a field strength on the channel and/or a mean bit error rate (BER) on the channel and/or a measured distance between a transmitter station (BS) and said subscriber stations (A; B).

9. A method according to claim 8, wherein said bit error rate (BER, RXQUAL__XX) is measured a predetermined first number of times ($N_{3init}$; N3) over a predetermined time period ($T_{speech}$) in each of said call states;
a second number of times ($P_{init}$; P) is determined indicating how often said measured bit error rate values (BER, RXQUAL__XX) exceed a predetermined maximum bit error rate ($BER_{max}$, L__RXQUAL);
the predetermined transmission conditions respectively specify a maximum number of times ($P3_{init}$; P3) that said measured bit error rate values (BEE, RXQUAL__XX) are allowed to exceed said maximum bit error rate (BER, RXQUAL__XX); and
a switching of the call to said another channel (CC2) is performed when said second number ($P_{init}$; P) is larger than said maximum number ($P3_{init}$; P3).

10. A method according to claim 9, wherein
said maximum number of times ($P3_{init}$; P3) for said first call state is lower than for said at least one second call state.

11. A method according to claim 1, wherein
the transmission conditions are dependent on the number of calls already occupying the channel (CC1) and/or the number of repetitive attempts of other calls to use the same channel.

12. A method according to claim 1, wherein
the call is successively set (M15) to a third, a fourth . . . and a n-th call state in which respectively third, fourth . . . and n-th different predetermined transmission conditions are used (M23) for determining a switching, when said second, third . . . (n–1)-th predetermined transmission conditions are not satisfied in said respective call states; and
n successive call states are provided, wherein a call priority indication is respectively used for each call and/or each subscriber station whici indicates that said call after being set up on said channel (CC1) is set into the 1st call state of said n call states and is set into the 2nd call state when the call is not switched in said 1st call state.

13. A method according to claim 1, wherein
the call is successively set (M15) to a third, a fourth . . . and a n-th call state in which respectively third, fourth . . . and n-th different predetermined transmission conditions are used (M23) for determining a switching, when said second, third . . . (n–1)-th predetermined transmission conditions are not satisfied in said respective call states; and
n successive call states are provided, wherein a call priority indication is respectively used for each call and/or each subscriber station which indicates that the call after being set up on the channel (CC1) is set into a predetermined call state of said n call states.

14. A method according to claim 13, wherein
said call priority indication further indicates the numbers of the call states into which the call set into said predetermined call state is to be successively set, if predetermined transmission conditions are fulfilled in respective call states.

15. A method according to claim 14, wherein
said call priority indication further indicates that a call after having been set to at least two different call states, will be kept in a call state, even if said predetermined transmission conditions are not fulfilled.

16. A method according to claim 1, wherein
the call is held in said first call state for a predetermined time period ($T_{init1}$) before being set into said second call state;
said call priority indication further indicates that a call after having been set to at least two different call states, will be kept in a call state, even if said predetermined transmission conditions are not fulfilled; and
said predetermined holding time and the predetermined transmission conditions in each call state are dependent on said call priority indication.

17. A communication system of a channel re-use type where at least two calls (A, B, C) between at least two subscriber stations MS1–MS4) can simultaneously use the same channel (CC1) when substantially no interference between them exists and where calls are switched to another channel (CC2) when a substantial interference between them exist, comprising:
a) a transmission condition determining means (TCDM) for determining transmission conditions of the calls on the channel (CC1);
b) a transmission condition setting means (TCSM) for setting predetermined transmission conditions for the calls; and
c) a switching means (SM) for switching the calls to another channel (CC2) when said determined transmission conditions do not satisfy predetermined transmission conditions;
d) a call state setting means (SSM) for setting a call after being set-up on a channel (CC1) into a first call state and for setting the call into at least a second call state, when the call is not switched to another channel (CC2) in said first call state;
e) said transmission condition setting means (TCSM) setting respectively different predetermined transmission conditions for said first and said at least one second call state; and
f) said switching means (SM) switching the call to another channel in said first or second call state when the determined transmission conditions of the call in said first or second call state do not satisfy said first or second predetermined transmission conditions, respectively.

18. A system according to claim 17, wherein
said call state setting means (SSM) holds the call in said first call state for a predetermined time period ($T_{init1}$) before setting the call into said second call state.

19. A system according to claim 17, wherein
said transmission condition setting means (TCSM) sets third, fourth . . . and n-th different predetermined transmission conditions for a third, fourth . . . and n-th call state and said call state setting means (SSM) successively sets the call to said third, fourth . . . and n-th call state in which said switching means respectively uses said third, fourth . . . and n-th different predetermined transmission conditions, when said second, third . . . (n–1)-th predetermined transmission conditions are not satisfied in said respective call states.

20. A system according to claim 19, wherein
said call state setting means (SSM) holds the call in said second, third, fourth . . . and n-th call state respectively for a predetermined time period ($T_{init1}$, $T_{init2}$) before setting the call to a next call state.

21. A system according to claim 19, wherein a n-th predetermined transmission condition specifies a lower transmission quality of the call than a transmission quality specified by a (n–1)-th predetermined transmission condition.

22. A system according to claim 19, wherein
said transmission conditions are dependent on the number of other calls already occupying said channel (CC1) and/or the number of repetitive attempts of other calls to use the same channel.

23. A system according to claim 1, wherein
when said switching means (SM) switches the call to the another channel (CC2) said call stage setting means (SSM) sets the call into said first call state on the another channel (CC2).

24. A system according to claim 17, wherein
said transmission condition determining means (TCDM) includes a field strength measurement means (6) for measuring a field strength on the channel and/or an error detection means (7) for detecting a mean bit error rate (BER) on the channel (CC1) and/or a distance measuring means (8) for measuring a distance between a transmitter station (BS) and the subscriber stations (A; B).

25. A system according to claim 24, wherein
said error detection means (7) measures said bit error rate (BER, RXQUAL_XX) a predetermined first number of times ($N3_{init}$; N3) over a predetermined time period ($T_{speech}$) in each of said call states;
said error detection means (7) determines a second number of times ($P_{init}$; P) indicating how often said measured bit error rate values (BER, RXQUAL_XX) exceed a predetermined maximum bit error rate ($BER_{max}$, L_RXQUAL);
said predetermined transmission conditions respectively specify a maximum number of times ($P3_{init}$; P3) that said measured bit error rate values (BER, RXQUAL_XX) are allowed to exceed said maximum bit error rate (BER, RXQUAL_XX); and
said switching means (SM) switches the call to said another channel (CC2) when said second number ($P_{init}$; P) is larger than said maximum number ($P3_{init}$; P3).

26. A system according to claim 25, wherein said maximum number of times for said first call state is lower than for said at least one second call state.

27. A system according to claim 17, wherein said transmission conditions are dependent on the number of other calls already occupying said channel (CC1) and/or the number of repetitive attempts of other calls to use the same channel.

28. A system according to claim 17, wherein the communication network (GSM, CTS) is a GSM network or a GSM-based cordless telephone system.

29. A system according to claim 28, wherein said switching means is a base station (BS) and/or a mobile station (MS) of said GSM-network.

30. A system according to claim 17, wherein
said transmission condition setting means (TCSM) sets third, fourth . . . and n-th different predetermined transmission conditions for a third, fourth . . . and n-th call state and said call state setting means (SSM) successively sets the call to said third, fourth . . . and n-th call state in which said switching means respectively uses said third, fourth . . . and n-th different predetermined transmission conditions, when said second, third . . . (n–1)-th predetermined transmission conditions are not satisfied in said respective call states; and
n successive call states are provided, wherein a call priority indication is respectively used for each call and/or each subscriber station which indicates that said call after being set up on said channel (CC1) is set into the 1st call state of said n call states and is set into the 2nd call state when the call is not switched in said 1st call state.

31. A system according to claim 17, wherein
said transmission condition setting means (TCSM) sets third, fourth . . . and n-th different predetermined transmission conditions for a third, fourth . . . and n-th call state and said call state setting means (SSM) successively sets the call to said third, fourth . . . and n-th call state in which said switching means respectively uses said third, fourth . . . and n-th different predetermined transmission conditions, when said second, third . . . (n–1)-th predetermined transmission conditions are not satisfied in said respective call states; and
n successive call states are provided, wherein a call priority indication is respectively used for each call and/or each subscriber station which indicates that said call after being set up on said channel (CC1) is set into a predetermined call state of said n call states.

32. A system according to claim 31, wherein
said call priority indication further indicates the numbers of the call states into which the call set into said predetermined call state is to be successively set, if predetermined transmission conditions are fulfilled in respective call states.

33. A system according to claim 32, wherein
said call priority indication further indicates that a call after having been set to at least two different call states, will be kept in a call state, even if said predetermined transmission conditions are not fulfilled.

34. A system according to claim 17, wherein
said call state setting means (SSM) holds the call in said first call state for a predetermined time period ($T_{init1}$) before setting the call into said second call state;
said call priority indication further indicates that a call after having been set to at least two different call states, will be kept in a call state, even if said predetermined transmission conditions are not fulfilled; and
said predetermined holding time and the predetermined transmission conditions in each call states are dependent on said call priority indication.

35. A switching apparatus (SA) in a communication system of a channel-reuse type where at least two calls (A, B, C) between at least two subscriber stations (MS1–MS4) can simultaneously use the same channel (CC1) when substantially no interference between them exists and said calls are switched to another channel (CC2) when a substantial interference between them exists, comprising:
a) a transmission condition determining means (TCDM) for determining transmission conditions of the calls on the channel (CC1);

b) a transmission condition setting means (TCSM) for setting predetermined transmission conditions for the calls;

c) a switching means (SM) for switching the calls when said determined transmission conditions do not satisfy predetermined transmission conditions;

d) a call state setting means (SSM) for setting a call after being set-up on a channel (CC1) into a first call state and for setting the all into at least a second call state, when the call is not switched in said first call state;

e) said transmission condition setting means (TCSM) setting respectively different predetermined transmission conditions for said first and said at least one second call state; and f) said switching means (SM) switching the call to another channel (CC2) in said first or second call state when said determined transmission conditions of the call in said first or second call state do not satisfy said first or second predetermined transmission conditions, respectively.

36. An apparatus (SA) according to claim 35, characterized in that said call state setting means (SSM) holds said call attempting to use a channel (CC2) already occupied at least one other call in said first call state for a predetermined time period ($T_{init1}$) before setting said call into said second call state.

37. An apparatus (SA) according to claim 35, wherein said transmission condition setting means (TCSM) sets third, fourth . . . and n-th different predetermined transmission conditions for a third, fourth . . . and n-th call state and said call state setting means successively sets the call to said third, fourth . . . and n-th call state in which said switching means respectively uses said third, fourth . . . and n-th different predetermined transmission conditions, when said second, third . . . (n−1)-th transmission conditions are not satisfied in said respective call states.

38. An apparatus (SA) according to claim 37, wherein a n-th predetermined transmission condition specifies a lower transmission quality of the call than a transmission quality specified by a (n−1)-th predetermined transmission condition.

39. An apparatus (SA) according to claim 35, wherein when said switching means (SM) switches the call to the another channel (CC2) said call state setting means sets the call in said first call state on the another channel (CC2).

40. An apparatus (SA) according to claim 35, wherein said transmission condition determining means (TCDM) includes a field strength measurement means (6) for measuring a field strength on the channel and/or an error detection means (7) for detecting a mean bit error rate (BER) on the channel and/or a distance measuring means (9) for measuring a distance be ween a transmitter station and the subscriber stations (A; B).

41. A base station (BS) of a GSM-network including a switching apparatus (SA) according to claim 35.

42. A mobile station (MS) of a GSM-network including a switching apparatus (SA) according to claim 35.

43. An apparatus according to claim 35, wherein said transmission condition setting means (TCSM) sets third, fourth . . . and n-th different predetermined transmission conditions for a third, fourth . . . and n-th call state and said call state setting means successively sets the call to said third, fourth . . . and n-th call state in which said switching means respectively uses said third, fourth . . . and n-th different predetermined transmission conditions, when said second, third . . . (n−1)-th transmission conditions are not satisfied in said respective call states; and n successive call states are provided, wherein a call priority indication is respectively used for each call and/or each subscriber station which indicates that said call after being set up on said channel (CC1) is set into the 1st call state of said n call states and is set into the 2nd call state when the call is not switched in said 1st call state.

44. An apparatus according to claim 35, wherein said transmission condition setting means (TCSM) sets third, fourth . . . and n-th different predetermined transmission conditions for a third, fourth . . . and n-th call state and said call state setting means successively sets the call to said third, fourth . . . and n-th call state in which said switching means respectively uses said third, fourth . . . and n-th different predetermined transmission conditions, when said second, third . . . (n−1)-th transmission conditions are not satisfied in said respective call states; and n successive call states are provided, wherein a call priority indication is respectively used for each call and/or each subscriber station which indicates that said call after being set up on said channel (CC1) is set into a predetermined call state of said n call states.

45. An apparatus according to claim 44, wherein said call priority indication further indicates the numbers of the call states into which the call set into said predetermined call state is to be successively set, if predetermined transmission conditions are fulfilled in respective call states.

46. An apparatus according to claim 45, wherein said call priority indication further indicates that a call after having been set to at least two different call states, will be kept in a call state, even if said predetermined transmission conditions are not fulfilled.

47. An apparatus according to claim 35, wherein said call state setting means (SSM) holds said call attempting to use a channel (CC2) already occupied at least one other call in said first call state for a predetermined time period ($T_{init1}$) before setting said call into said second call state;

said call priority indication further indicates that a call after having been set to at least two different call states, will be kept in a call state, even if said predetermined transmission conditions are not fulfilled; and said predetermined holding time and the predetermined transmission conditions in each call states are dependent on said call priority indication.

48. A method for switching (S6, S12) calls (A, B, C) set-up (S1, S2) between at least two subscriber stations (MS1–MS4) on a respective channel (CC1) to another channel (CC2) in a communication network (GSM, CTS) of a channel re-use type where at least two calls (A, B, C) can simultaneously use the same channel (CC1), the transmis sion conditions of calls are determined (S4, S10) and calls are switched to another channel (CC2) when their transmission conditions do not satisfy predetermined transmission conditions (S5, S11), comprising the steps in which each call after being set-up on a channel (CC1) is set (S3) in a first call state, in which the call is switched to another channel when its transmission condition does not satisfy a first predetermined transmission condition, and is set (S8, S9) to at least a second call state, when the call is not switched (S5) in said first call state, wherein in said second call state the call is switched to another channel when its transmission condition does not satisfy (S11) a second predetermined transmission condition different from said first predetermined transmission condition; wherein the call is held in said first call state for a predetermined time period ($T_{init1}$) before being set into said second call state.

49. A method for switching (S6, S12) calls (A, B, C) set-up (S1, S2) between at least two subscriber stations (MS1–MS4) on a respective channel (CC1) to another channel (CC2) in a communication network (GM, CTS) of a channel re-use type where at least two calls (A, B, C) can simultaneously use the same channel (CC1), the transmission conditions of calls are determined (S4, S10) and calls are switched to another channel (CC2) when their transmission conditions do not satisfy predetermined transmission conditions (S5, S11), comprising the steps in which each call after being set-up on a channel (CC1) is set (S3) in a first call state, in which the call is switched to another channel when its transmission condition does not satisfy a first predetermined transmission condition, and is set (S8, S9) to at least a second call state, when the call is not switched (S5) in said first call state, wherein in said second call state the call is switched to another channel when its transmission condition does not satisfy (S11) a second predetermined transmission condition different from said first predetermined transmission condition; wherein the call is successively set (M15) to a third, a fourth . . . and a n-th call state in which respectively third, fourth . . . and n-th different predetermined transmission conditions are used (M23) for determining switching, when said second, third . . . (n−1)-th predetermined transmission conditions are not satisfied in said respective call states.

50. A method for switching (S6, S12) calls (A, B, C) set-up (S1, S2) between at least two subscriber stations (MS1–MS4) on a respective channel (CC1) to another channel (CC2) in a communication network (GSM, CTS) of a channel re-use type where at least two calls (A, B, C) can simultaneously use the same channel (CC1), the transmission conditions of calls are determined (S4, S10) and calls are switched to another channel (CC2) when their transmission conditions do not satisfy predetermined transmission conditions (S5, S11), comprising the steps in which each call after being set-up on a channel (CC1) is set (S3) in a first call state, in which the call is switched to another channel when its transmission condition does not satisfy a first predetermined transmission condition, and is set (S8, S9) to at least a second call state, when the call is not switched (S5) in said first call state, wherein in said second call state the call is switched to another channel when its transmission condition does not satisfy (S11) a second predetermined transmission condition different from said first predetermined transmission condition; wherein a bit error rate (BER, RXQUAL_XX) is measured a predetermined first number of times ($N3_{init}$; N3) over a predetermined time period ($T_{speech}$) in each of said call states;

a second number of times ($P_{init}$; P) is determined indicating how often said measured bit error rate values (BER, RXQUAL_XX) exceed a predetermined maximum bit error rate ($BER_{max}$, L_RXQUAL);

the predetermined transmission conditions respectively specify a maximum number of times ($P3_{init}$; P3) that said measured bit error rate values (BER, RXQUAL_XX) are allowed to exceed said maximum bit error rate (BER, RXQUAL_XX); and a switching of the call to said another channel (CC2) is performed when said second number ($P_{init}$; P) is larger than said maximum number ($P3_{init}$; P3).

51. A method for switching (S6, S12) calls (A, B, C) set-up (S1, S2) between at least two subscriber stations (MS1–MS4) on a respective channel (CC1) to another channel (CC2) in a communication network (GSM, CTS) of a channel re-use type where at least two calls (A, B, C) can simultaneously use the same channel (CC1), the transmission conditions of calls are determined (S4, S10) and calls are switched to another channel (CC2) when their transmission conditions do not satisfy predetermined transmission conditions (S5, S11), comprising the steps in which each call after being set-up on a channel (CC1) is set (S3) in a first call state, in which the call is switched to another channel when its transmission condition does not satisfy a first predetermined transmission condition, and is set (S8, S9) to at least a second call state, when the call is not switched ((S5) in said first call state, wherein in said second call state the call is switched to another channel when its transmission condition does not satisfy (S11) a second predetermined transmission condition different from said first predetermined transmission condition; wherein the call is successively set M15) to a third, a fourth . . . and a n-th call state in which respectively third, fourth . . . and n-th different predetermined transmission conditions are used (M23) for determining a switching, when said second, third . . . (n−1)-th predetermined transmission conditions are not satisfied in said respective call states; and a n-th predetermined transmission condition specifies a lower transmission quality of the call than a transmission quality specified by a (n−1)-th predetermined transmission condition.

52. A communication system of a channel re-use type where at least two calls (A, B, C) between at least two subscriber stations (MS1–MS4) can simultaneously use the same channel (CC1) when substantially no interference between them exists and where calls are switched to another channel (CC2) when a substantial interference between them exist, comprising:

a) a transmission condition determining means (TCDM) for determining transmission conditions of the calls on the channel (CC1);

b) a transmission condition setting means (TCSM) for setting predetermined transmission conditions for the calls; and c) a switching means (SM) for switching the calls to another channel (CC2) when said determined transmission conditions do not satisfy predetermined transmission conditions;

d) a call state setting means (SSM) for setting a call after being set-up on a channel (CC1) into a first call state and for setting the call into at least a second call state, when the call is not switched to another channel (CC2) in said first call state;

e) said transmission condition setting means (TCSM) setting respectively different predetermined transmission conditions for said first and said at least one second call state;

f) said switching means (SM) switching the call to another channel in said first or second call state when the determined transmission conditions of the call in said first or second call state do not satisfy said first or second predetermined transmission conditions, respectively; and g) said call state setting means (SSM) holding the call in said first call state for a predetermined time period ($T_{init1}$) before setting the call into said second call state.

53. A communication system of a channel re-use type where at least two calls (A, B, C) between at least two subscriber stations (MS1–MS4) can simultaneously use the same channel (CC1) when substantially no interference between them exists and where calls are switched to another channel (CC2) when a substantial interference between them exist, comprising:

a) a transmission condition determining means (TCDM) for determining transmission conditions of the calls on the channel (CC1);

b) a transmission condition setting means (TCSM) for setting predetermined transmission conditions for the calls; and c) a switching means (SM) for switching the calls to another channel (CC2) when said determined transmission conditions do not satisfy predetermined transmission conditions;

d) a call state setting means (SSM) for setting a call after being set-up on a channel (CC1) into a first call state and for setting the call into at least a second call state, when the call is not switched to another channel (CC2) in said first call state;

e) said transmission condition setting means (TCSM) setting respectively different predetermined transmission conditions for said first and said at least one second call state;

f) said switching means (SM) switching the call to another channel in said first or second call state when the determined transmission conditions of the call in said first or second call state do not satisfy said first or second predetermined transmission conditions, respectively; and g) said transmission condition setting means (TCSM) setting third, fourth . . . and n-th different predetermined transmission conditions for a third, fourth . . . and n-th call state and said call state setting means (SSM) successively setting the call to said third, fourth . . . and n-th call state in which said switching means respectively uses said third, fourth . . . and n-th different predetermined transmission conditions, when said second, third . . . (n–1)-th predetermined transmission conditions are not satisfied in said respective call states.

54. A communication system of a channel re-use type where at least two calls (A, B, C) between at least two subscriber stations (MS1–MS4) can simultaneously use the same channel (CC1) when substantially no interference between them exists and where calls are switched to another channel (CC2) when a substantial interference between them exist, comprising:

a) a transmission condition determining means (TCDM) for determining transmission conditions of the calls on the channel (CC1);

b) a transmission condition setting means (TCSM) for setting predetermined transmission conditions for the calls;

c) a switching means (SM) for switching the calls to another channel (CC2) when said determined transmission conditions do not satisfy predetermined transmission conditions;

d) a call state setting means (SSM) for setting a call after being set-up on a channel (CC1) into a first call state and for setting the call into at least a second call state, when the call is not switched to another channel (CC2) in said first call state;

e) said transmission condition setting means (TCSM) setting respectively different predetermined transmission conditions for said first and said at least one second call state;

f) said switching means (SM) switching the call to another channel in said first or second call state when the determined transmission conditions of the call in said first or second call state do not satisfy said first or second predetermined transmission conditions, respectively; wherein g) an error detection means (7) measures said bit error rate (BER, RXQUAL_XX) a predetermined first number of times ($N3_{init}$; N3) over a predetermined time period ($T_{speech}$) in each of said call states;

an error detection means (7) determines a second number of times ($P_{init}$; P) indicating how often said measured bit error rate values (BER, RXQUAL_XX) exceed a predetermined maximum bit error rate ($BER_{max}$, L_RXQUAL);

said predetermined transmission conditions respectively specify a maximum number of times ($P3_{init}$; P3) that said measured bit error rate values (BER, RXQUAL_XX) are allowed to exceed said maximum bit error rate (BER, RXQUAL_XX); and said switching means (SM) switchrd the call to said another channel (CC2) when said second number ($P_{init}$; P) is larger than said maximum number ($P3_{init}$; P3).

55. A communication system of a channel re-use type where at least two calls (A, B, C) between at least two subscriber stations (MS1–MS4) can simultaneously use the same channel (CC1) when substantially no interference between them exists and where calls are switched to another channel (CC2) when a substantial interference between them exist, comprising:

a) a transmission condition determining means (TCDM) for determining transmission conditions of the calls on the channel (CC1);

b) a transmission condition setting means (TCSM) for setting predetermined transmission conditions for the calls; and c) a switching means (SM) for switching the calls to another channel (CC2) when said determined transmission conditions do not satisfy predetermined transmission conditions;

d) a call state setting means (SSM) for setting a call after being set-up on a channel (CC1) into a first call state and for setting the call into at least a second call state, when the call is not switched to another channel (CC2) in said first call state;

e) said transmission condition setting means (TCSM) setting respectively different predetermined transmission conditions for said first and said at least one second call state;

f) said switching means (SM) switching the call to another channel in said first or second call state when the determined transmission conditions of the call in said first or second call state do not satisfy said first or second predetermined transmission conditions, respectively; wherein g) said transmission condition setting means (TCSM) sets third, fourth . . . and n-th different predetermined transmission conditions for a third, fourth . . . and n-th call state and said call state setting means (SSM) successively sets the call to said third, fourth . . . and n-th call state in which said switching means respectively uses said third, fourth . . . and n-th different predetermined transmission conditions, when said second, third . . . (n−1)-th predetermined transmission conditions are not satisfied irn said respective call states; and h) a n-th predetermined transmission condition specifies a lower transmission quality of the call than a transmission quality specified by a (n−1)-th predetermined transmission condition.

56. A switching apparatus (SA) in a communication system of a channel-reuse type where at least two calls (A, B, C) between at least two subscriber stations (MS1–MS4) can simultaneously use the same channel (CC1) when substantially no interference between them exists and said calls are switched to another channel (CC2) when a substantial interference between them exists, comprising:

a) a transmission condition determining means (TCDM) for determining transmission conditions of the calls on the channel (CC1);

b) a transmission condition settinig means (TCSM) for setting predetermined transmission conditions for the calls;

c) a switching means (SM) for switching the calls when said determined transmission conditions do not satisfy predetermined transmission conditions;

d) a call state setting means (SSM) for setting a call after being set-up on a channel (CC1) into a first call state and for setting the call into at least a second call state, when the call is not switched in said first call state;

e) said transmission condition setting means (TCSM) setting respectively different predetermined transmission conditions for said first and said at least one second call state;

f) said switching means (SM) switching the call to another channel (CC2) in said first or second call state when said determined transmission conditions of the call in said first or second call state do not satisfy said first or second predetermined transmission conditions, respectively; wherein g) said call state setting means (SSM) holds said call attempting to use a channel (CC2) already occupied at least one other call in said first call state for a predetermined time period ($T_{init1}$) before setting said call into said second call state.

57. A switching apparatus (SA) in a communication system of a channel-reuse type where at least two calls (A, B, C) between at least two subscriber stations (MS1–MS4) can simultaneously use the same channel (CC1) when substantially no interference between them exists and said calls are switched to another channel (CC2) when a substantial interference between them exists, comprising:

a) a transmission condition determining means (TCDM) for determining transmission conditions of the calls on the channel (CC1);

b) a transmission condition setting means (TCSM) for setting predetermined transmission conditions for the calls;

c) a switching means (SM) for switching the calls when said determined transmission conditions do not satisfy predetermined transmission conditions;

d) a call state setting means (SSM) for setting a call after being set-up on a channel (CC1) into a first call state and for setting the call into at least a second call state, when the call is not switched in said first call state;

e) said transmission condition setting means (TCSM) setting respectively different predetermined transmission conditions for said first and said at least one second call state;

f) said switching means (SM) switching the call to another channel (CC2) in said first or second call state when said determined transmission conditions of the call in said first or second call state do not satisfy said first or second predetermined transmission conditions, respectively; wherein g) said transmission condition setting means (TCSM) setting third, fourth . . . and n-th different predetermined transmission conditions for a third, fourth . . . and n-th call state and said call state setting means successively sets the call to said third, fourth . . . and n-th call state in which said switching means respectively uses said third, fourth . . . and n-th different predetermined transmission conditions, when said second, third . . . (n−1)-th transmission conditions are not satisfied in said respective cell states.

58. A switching apparatus (SA) in a communication system of a channel-reuse type where at least two calls (A, B, C) between at least two subscriber stations (MS1–MS4) can simultaneously use the same channel (CC1) when substantially no interference between them exists and said calls are switched to another channel (CC2) when a substantial interference between them exists, comprising:

a) a transmission condition determining means (TCDM) for determining transmission conditions of the calls on the channel (CC1);

b) a transmission condition setting means (TCSM) for setting predetermined transmission conditions for the calls;

c) a switching means (SM) for switching the calls when said determined transmission conditions do not satisfy predetermined transmission conditions;

d) a call state setting means (SSM) for setting a call after being set-up on a channel (CC1) into a first call state and for setting the call into at least a second call state, when the call is not switched in said first call state;

e) said transmission condition setting means (TCSM) setting respectively different predetermined transmission conditions for said first and said at least one second call state; and f) said switching means (SM) switching the call to another channel (CC2) in said first or second call state when said determined transmission conditions of the call in said first or second call state do not satisfy said first or second predetermined transmission conditions, respectively;

g) said transmission condition setting means (TCSM) setting third, fourth . . . and n-th different predetermined transmission conditions for a third, fourth . . . and n-th call state and said call state setting means successively sets the call to said third, fourth . . . and n-th call state in which said switching means respectively uses said third, fourth . . . and n-th different predetermined transmission conditions, when said second, third . . . (n−1)-th transmission conditions are not satisfied in said respective call states; wherein h) a n-th predetermined transmission condition specifies a lower transmission quality of the call than a transmission quality specified by a (n−1)-th predetermined transmission condition.

* * * * *